(12) United States Patent
Limber

(10) Patent No.: US 11,885,460 B1
(45) Date of Patent: Jan. 30, 2024

(54) SYSTEM AND METHOD FOR HANGING DECORATIVE LIGHTING

(71) Applicant: Simple Living Solutions, LLC, Scottsdale, AZ (US)

(72) Inventor: Jamie Limber, Phoenix, AZ (US)

(73) Assignee: Simple Living Solutions, LLC, Scottsdale, AZ (US)

( * ) Notice: Subject to any disclaimer, the term of this patent is extended or adjusted under 35 U.S.C. 154(b) by 0 days.

(21) Appl. No.: 17/579,556

(22) Filed: Jan. 19, 2022

(51) Int. Cl.
 *F16M 13/02* (2006.01)
 *F21V 21/16* (2006.01)
(52) U.S. Cl.
 CPC .......... *F16M 13/022* (2013.01); *F21V 21/16* (2013.01)
(58) Field of Classification Search
 CPC ............................. F16M 13/022; F21V 21/16
 See application file for complete search history.

(56) References Cited

U.S. PATENT DOCUMENTS

| | | | | |
|---|---|---|---|---|
| 2,292,140 A | * | 8/1942 | Lofgren | H01R 13/72 256/10 |
| D266,142 S | * | 9/1982 | Sikstrom | D8/356 |
| D369,292 S | * | 4/1996 | Gary | D8/367 |
| 5,607,230 A | * | 3/1997 | Protz, Jr. | F21V 21/088 362/396 |
| D385,776 S | * | 11/1997 | Protz, Jr. | A45F 5/00 D8/395 |
| D401,005 S | * | 11/1998 | Ludbrook | H02G 3/24 D8/395 |
| 7,997,773 B2 | * | 8/2011 | Kraus | H02G 3/24 362/396 |
| D647,787 S | * | 11/2011 | Duval | H01R 13/72 D8/394 |
| 9,603,440 B2 | * | 3/2017 | Nguyen | A45F 5/00 |
| 10,144,123 B1 | * | 12/2018 | Shaw | B25H 3/003 |

* cited by examiner

*Primary Examiner* — Anita M King
(74) *Attorney, Agent, or Firm* — Michelle L. Gross, P.C.

(57) ABSTRACT

A system and method for securing a cable with decorative lights to an existing cable is disclosed. An outdoor lighting clip which comprises a curve and annular portion for securing two cables in proximity to each other. In use, the annular portion has a slot which may be secured over a first cable such that the clip hangs from the first cable. A second cable may then be hung on the curve of the clip, such that the first cable and second cable remain in proximity to each other. This allows the second cable to have lighting decorations hanging without sagging in the middle of cable and without the cable needing to be in tension between two anchor points. Many lighting decorations include a loop on their cable for hanging from hooks, and this clip is compatible with allowing the second cable to hang from the clip by the loop.

15 Claims, 6 Drawing Sheets

SYSTEM AND METHOD FOR HANGING DECORATIVE LIGHTING

BACKGROUND

1. Field of the Invention

The present invention in general relates to a clip for hanging decorations, and in particular to a clip for hanging decorative lights from a cable extending between two fixed points.

2. Description of Related Art

Outdoor lights can be useful for a variety of purposes from mere lighting to decorations for everyday and holiday use. Many types of clips and hooks exist for hanging outdoor lighting. However, hanging methods which rely on tension can put strain on the wiring and reduce the lifespan of lighting systems. To deal with this many outdoor lighting manufacturers provide loops for coupling with a hook so that outdoor lights can be hung from a secondary cable. This reduces tension in the wires of the lights and keeps strings of outdoor lights from sagging between lights. Many manufacturers recommend using zip ties or other household solutions for as the connector between the secondary cable and the outdoor light. These connectors carry several disadvantages such as unsightliness or a lack of reusability.

SUMMARY

Implementations of an apparatus for hanging outdoor lights may comprise a clip having a first length extending from a first end of a curve, the curve having a second end with a second length extending from the second end substantially parallel to the first length and forming an annular portion, the annular portion having a slot at a segment along the annular portion proximal to the second length of the clip.

Particular aspects may comprise one or more of the following features. The clip is constructed of a plastic material. The second length may extend from the second end at a substantially converging angle to the first length. The slot may further comprise a chamfer at a portion distal to the center of the annular portion. The first length further may extend to form a nub at an angle obtuse to the first length, the nub extending away from the annular portion.

Implementations of a method for hanging outdoor lights may comprise attaching a clip to a first cable via a slot on the clip. The clip may comprise a first length extending from a first end of a curve, the curve having a second end with a second length extending from the second end substantially parallel to the first length and forming an annular portion, the annular portion having the slot at a segment along the annular portion proximal to the second length of the clip. The method continues by hanging a second cable on the curve between the first length and the second length.

Particular aspects of this method may comprise one or more of the following features and steps. The second cable may further comprise a loop which slides over the first length and hangs on the curve of the clip. The second cable may further comprise a light bulb. The clip may be constructed of a plastic material. The second length may extend from the second end at a substantially converging angle to the first length. The slot may further comprise a chamfer at a portion distal to the center of the annular portion. The first length may further extend to form a nub at an angle obtuse to the first length, the nub extending away from the annular portion. The second cable may further comprise a light bulb when the second cable also comprises a loop.

Implementations of a method for hanging outdoor lights may comprise attaching a clip to a first cable via a slot on the clip. The clip may comprise a first length extending from a first end of a curve, the curve having a second end with a second length extending from the second end substantially parallel to the first length and forming an annular portion, the annular portion having the slot at a segment along the annular portion distal to the curve. The method continues with hanging a second cable on the curve between the first length and the second length.

Particular aspects may comprise one or more of the following features. The second cable may further comprise a loop which slides over the first length and hangs on the curve of the clip. The second cable may further comprise a light bulb. The clip may be constructed of a plastic material. The second length may extend from the second end at a substantially converging angle to the first length. The slot may further comprise a chamfer at a portion distal to the center of the annular portion. The first length may further extend to form a nub at an angle obtuse to the first length, the nub extending away from the annular portion.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or Claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION, DRAWINGS, and CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
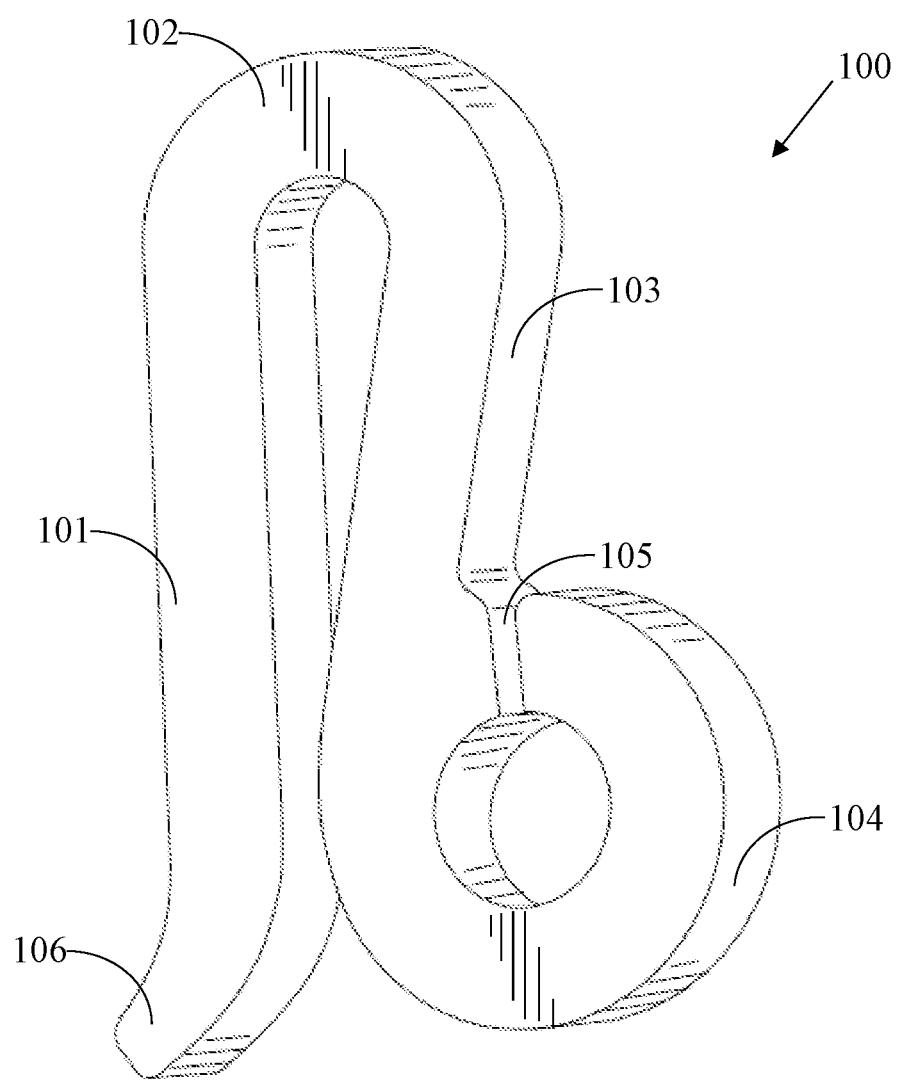
FIG. 1 depicts a perspective view of an outdoor lighting clip with a slot proximal to a first bend.

The present disclosure relates to systems and methods for securing a cable of lights to another cable. Referring now to FIG. 1, an exemplary embodiment of an outdoor lighting clip 100 is shown. In many embodiments the outdoor lighting clip 100 comprises a first length 101, a curve 102, a second length 103, an annular portion 104, and a slot 105. In many embodiments the slot 105 is at a segment of the annular portion 104 proximal to the second length 103. In many embodiments the outdoor lighting clip 100 may be secured to a first cable via the slot 105 such that the cable rests within the annular portion 104. In these and other embodiments a second cable may then rest on the curve 102, the outdoor lighting clip 100 thus securing the first and second cable in proximity to one another. In some embodiments the outdoor lighting clip 100 may also include a nub 106 which extends from the first length 101 at an obtuse angle.

Figure 2:
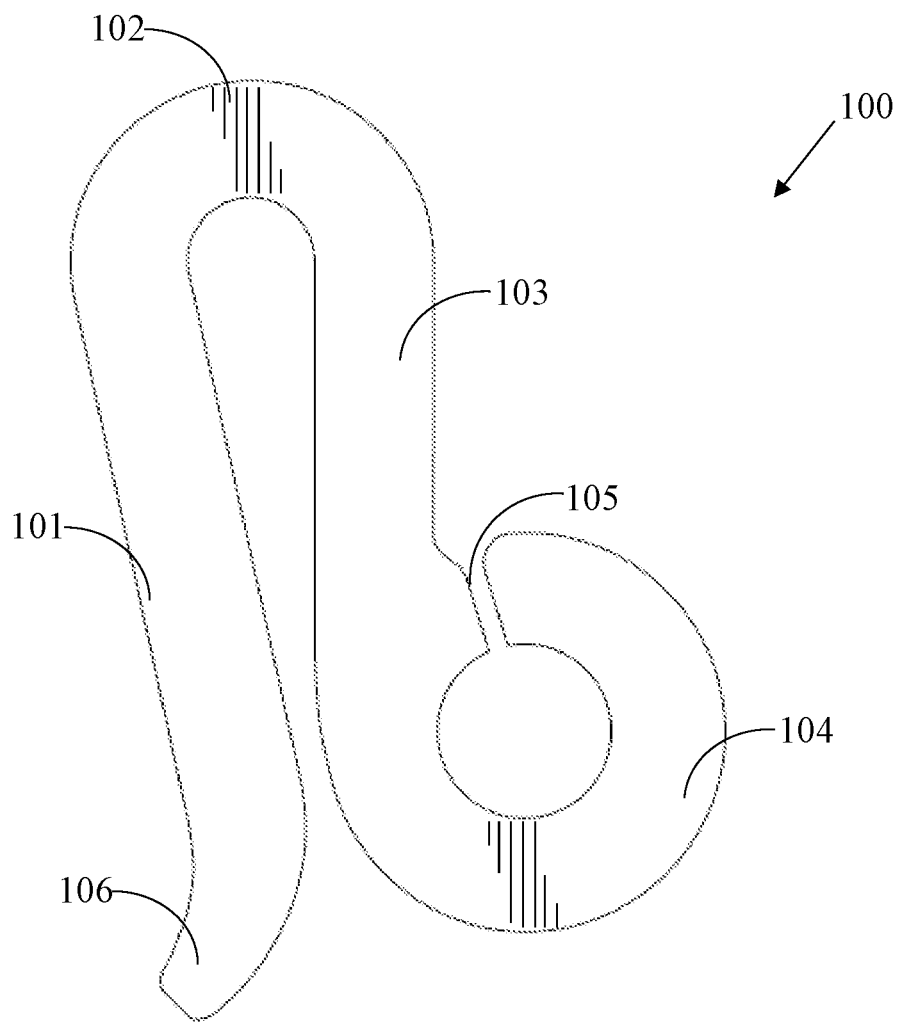
FIG. 2 depicts a side view of an outdoor lighting clip with a slot proximal to a first bend.

In many embodiments the outdoor lighting clip 100 is comprised of a malleable material such as a plastic, such that the annular portion 104 can bend to allow a cable to be accommodated through the slot 105 and rest within the annular portion 104. In these and other embodiments the malleability of the material may also allow the first length to bend to accommodate a second cable to rest upon the curve 102. Referring now to FIG. 2 a clearer view of the curve 102 and the relationship between the first length 101 and second length 103 can be seen. In many embodiments the first length 101 and second length 103 may form a convergent angle. In these and other embodiments when a cable is resting on the curve 102, the convergent angle between the first length 101 and the second length 103 may prevent the cable from freely sliding away from the curve 102.

Figure 3:
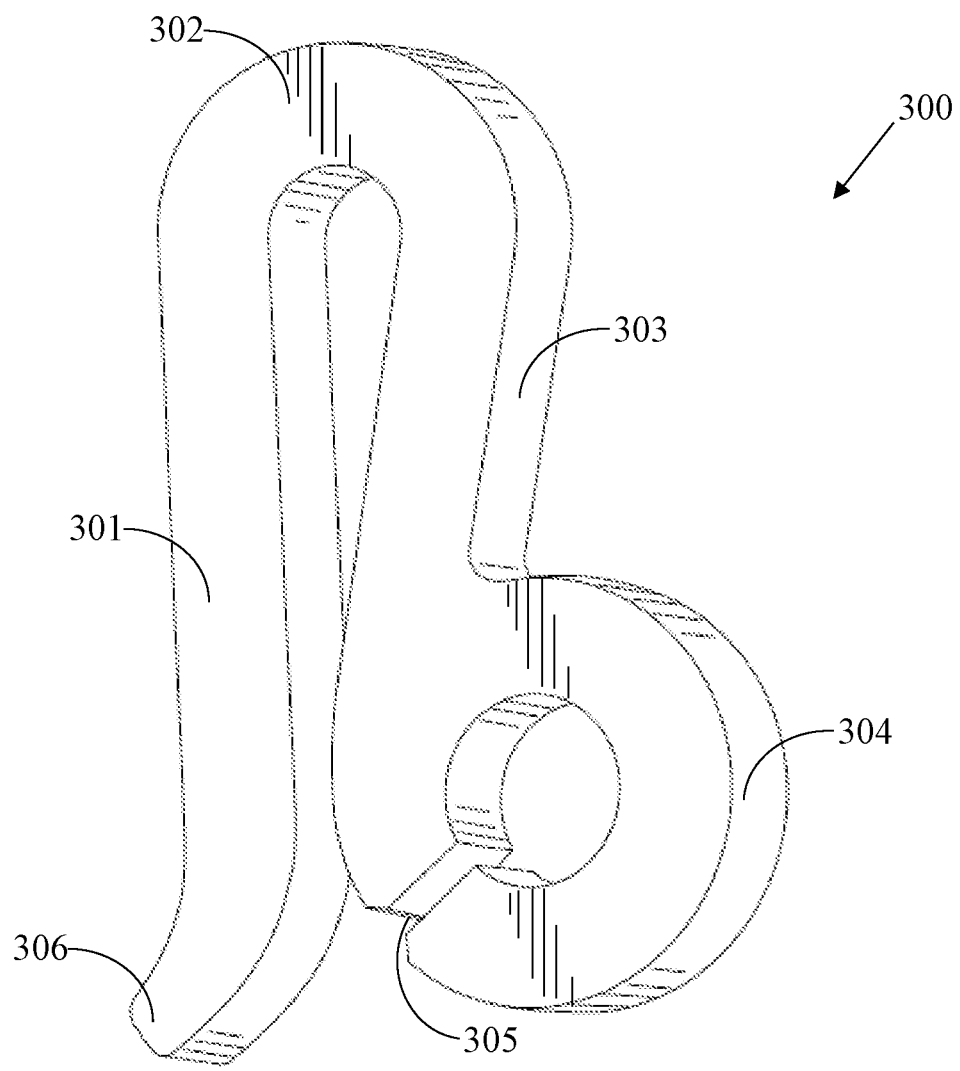
FIG. 3 depicts a perspective view of an outdoor lighting clip with a slot distal to a first bend.
Figure 4:
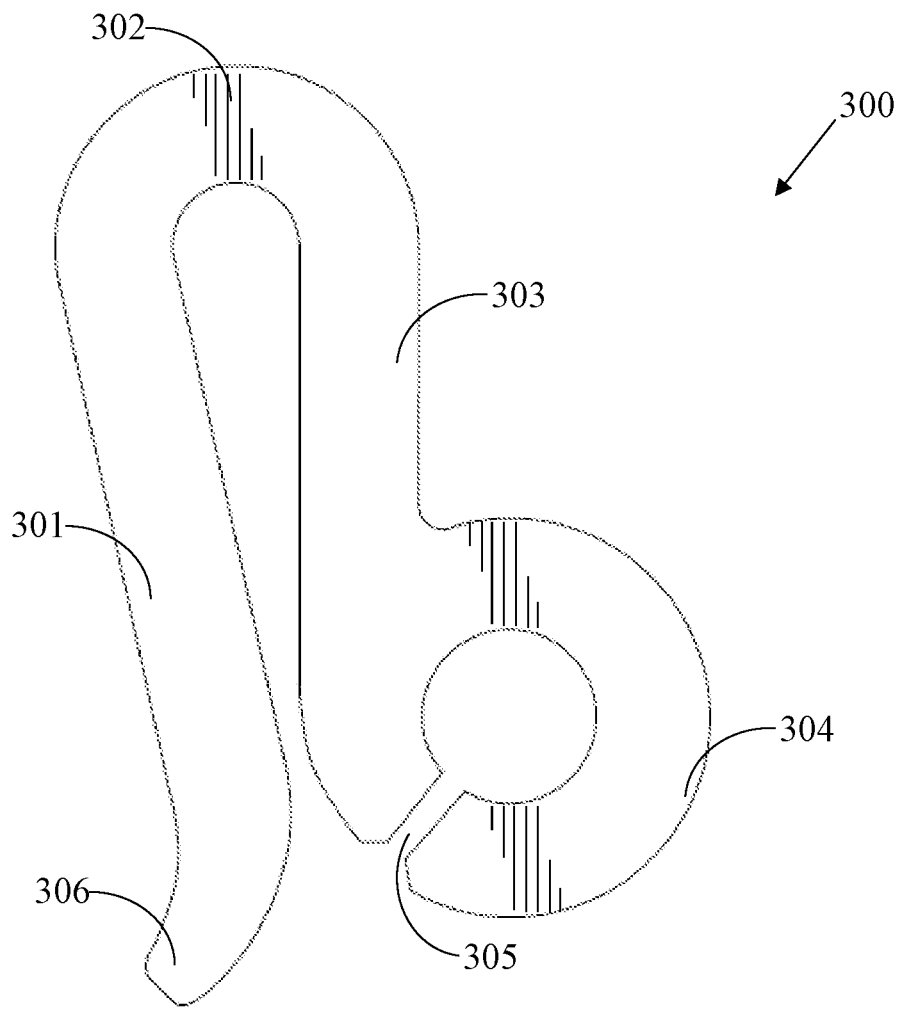
FIG. 4 depicts a side view of an outdoor lighting clip with a slot distal to a first bend.

Referring now to FIG. 3, an exemplary embodiment of an outdoor lighting clip 300 is shown. In many embodiments the outdoor lighting clip 300 comprises a first length 301, a curve 302, a second length 303, an annular portion 304, and a slot 305. In many embodiments the slot 305 of the outdoor lighting clip 300 is distal to the second length 303. In these and other embodiments the outdoor lighting clip 300 may also be comprised of a malleable material such as a plastic. In some embodiments the outdoor lighting clip 300 may also include a nub 306 which extends from the first length 301 at an obtuse angle. Referring now to FIG. 4 a clearer view of the slot 305 may be seen. In many embodiments the slot 305, the part of the slot 305 distal to the center of the annular portion 304 may comprise a chamfer. In some embodiments the angle between the first length 301 and the second length 303 may also be convergent such that a cable resting on the curve 302 may not be able to freely slide away from the curve 302.

Figure 5:
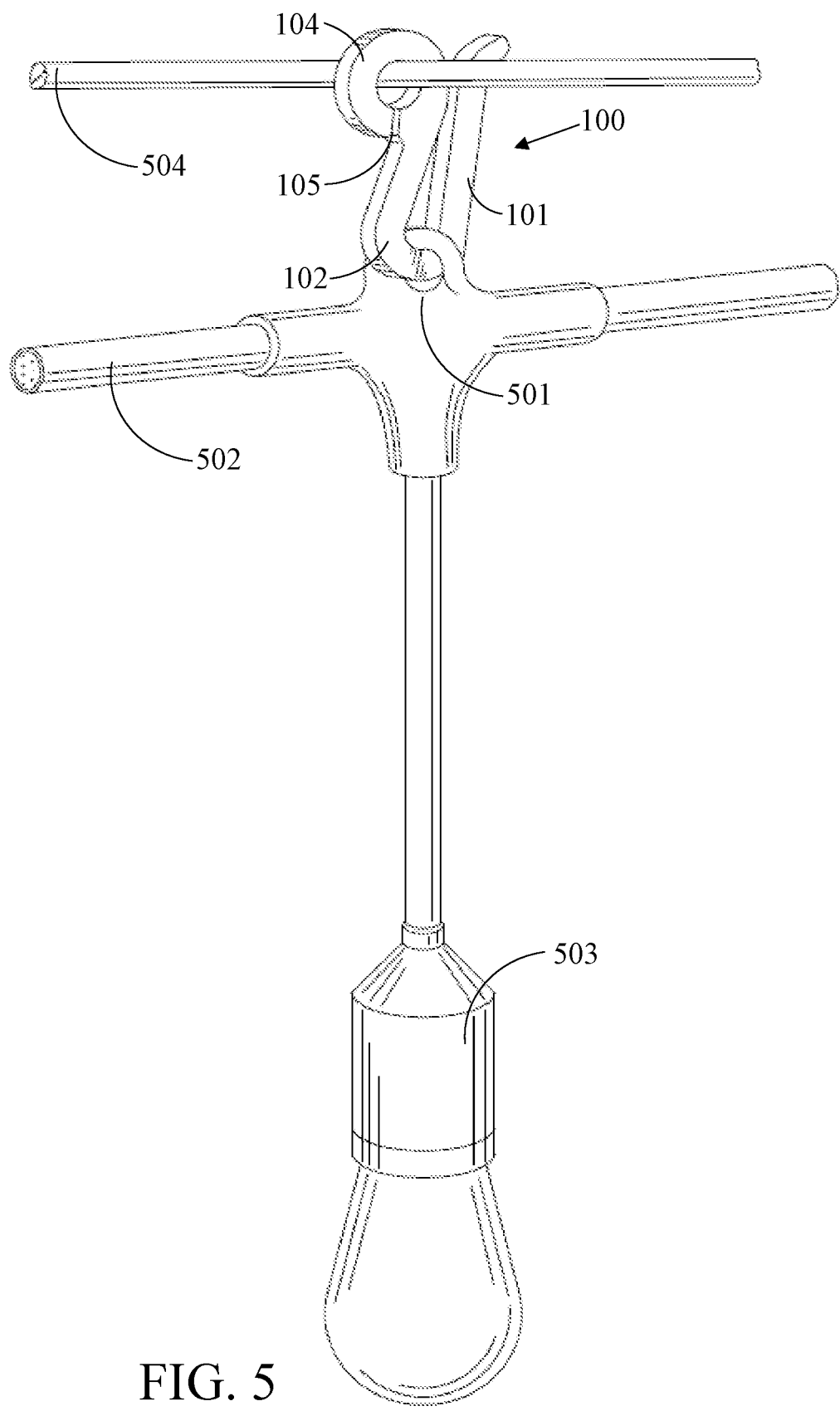
FIG. 5 depicts an embodiment of an outdoor lighting clip coupled with a loop from a string of outdoor lights.

Referring now to FIG. 5, an exemplary embodiment of an outdoor lighting clip 100 in use with a first cable 504 and second cable 502 is shown. In many embodiments of the outdoor lighting clip 100, the second cable 502 may have a loop 501 such that the loop 501 may slide over the first length 101 in order to secure the second cable 502 to the outdoor lighting clip 100 at the curve 102. In these and other embodiments the outdoor lighting clip 100 may be secured to a first cable 504 by sliding the first cable 504 through the slot 105 such that the outdoor lighting clip 100 hangs from the first cable 504 by the annular portion 104. In many embodiments the second cable 502 may further include a lighting decoration 503 such as a light bulb. The lighting decoration 503 may be of any type known in the art such as a light emitting diode (LED), incandescent bulb, fluorescent bulb, or other lighting systems appropriate for hanging via a cable.

Figure 6:
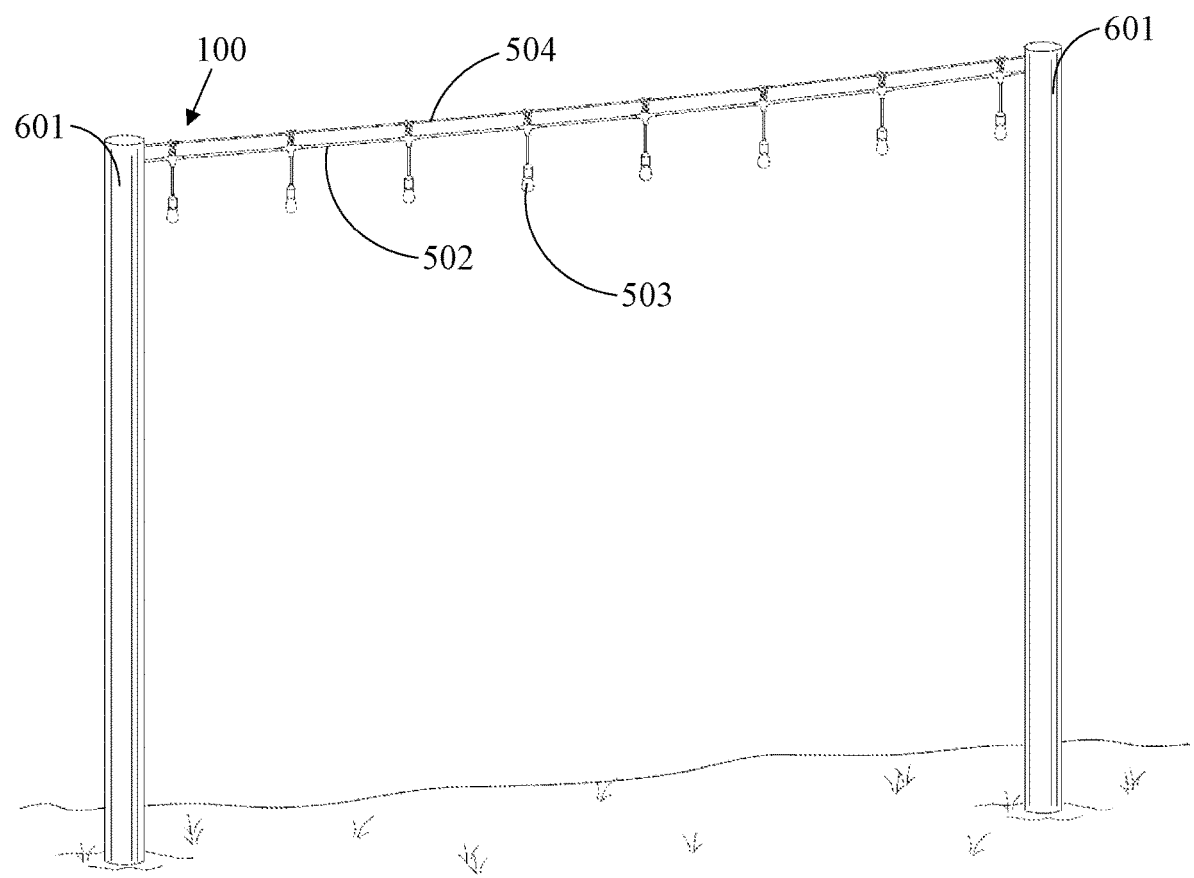
FIG. 6 depicts an exemplary embodiment of a series of outdoor lighting clips used to couple a strand of outdoor lights to a support cable affixed between two poles.

Referring now to FIG. 6, an exemplary embodiment of an outdoor lighting cable 100 is shown holding a first cable 504 and a second cable 502 in proximity to each other. In many embodiments the first cable 504 may be in tension between two anchor points 601. In these and other embodiments the second cable 502 may have a lighting decoration 503 and be anchored to the two anchor points 601. In many embodiments the outdoor lighting clip 100 may be hanging from the first cable 504 and supporting the second cable 502 in proximity to the first cable 504.

In places where the description above refers to particular implementations of systems and methods for hanging decorative lighting, it should be readily apparent that a number of modifications may be made without departing from the spirit thereof and that these implementations may be applied to other to systems and methods for hanging decorative lighting.

I claim:

1. A method for hanging outdoor lights, the method comprising:
   attaching a clip to a first cable via a slot on the clip, the clip comprising:
     a first length extending from a first end of a curve, the curve having a second end with a second length extending from the second end substantially parallel to the first length and forming an annular portion, the annular portion having the slot at a segment along the annular portion proximal to the second length of the clip;
   hanging a second cable on the curve between the first length and the second length.

2. The method of claim 1 wherein the second cable further comprises a loop which slides over the first length and hangs on the curve of the clip.

3. The method of claim 1 wherein the second cable further comprises a light bulb.

4. The method of claim 1 wherein the clip is constructed of a plastic material.

5. The method of claim 1 wherein the second length extends from the second end at a substantially converging angle to the first length.

6. The method of claim 1 wherein the slot further comprises a chamfer at a portion distal to the center of the annular portion.

7. The method of claim 1 wherein the first length further extends to form a nub at an angle obtuse to the first length, the nub extending away from the annular portion.

8. The method of claim 2 wherein the second cable further comprises a light bulb.

9. A method for hanging outdoor lights, the method comprising:
   attaching a clip to a first cable via a slot on the clip, the clip comprising:
     a first length extending from a first end of a curve, the curve having a second end with a second length extending from the second end substantially parallel to the first length and forming an annular portion, the annular portion having the slot at a segment along the annular portion distal to the curve;
   hanging a second cable on the curve between the first length and the second length.

10. The method of claim 9 wherein the second cable further comprises a loop which slides over the first length and hangs on the curve of the clip.

11. The method of claim 9 wherein the second cable further comprises a light bulb.

12. The method of claim 9 wherein clip is constructed of a plastic material.

13. The method of claim 9 wherein the second length extends from the second end at a substantially converging angle to the first length.

14. The method of claim 9 wherein the slot further comprises a chamfer at a portion distal to the center of the annular portion.

15. The method of claim 9 wherein the first length further extends to form a nub at an angle obtuse to the first length, the nub extending away from the annular portion.

* * * * *